United States Patent [19]
Grenot et al.

[11] Patent Number: 5,732,081
[45] Date of Patent: Mar. 24, 1998

[54] METHOD AND DEVICE FOR THE TRANSLATION OF A CELL HEADER APPLIED TO THE ENTRANCE TO A NODE OF AN ASYNCHRONOUS NETWORK FOR THE TRANSMISSION OF DATA BY PACKETS

[75] Inventors: Thierry Grenot, Clamart; Dominique Conti, Issy Les Moulineaux; François Tarbouriech, Les Ulis, all of France

[73] Assignee: Thomson-CSF, Paris, France

[21] Appl. No.: 550,592

[22] Filed: Oct. 31, 1995

[30] Foreign Application Priority Data

Nov. 4, 1994 [FR] France ................. 94 13197

[51] Int. Cl.$^6$ ............... H04J 2/36; H04L 12/56
[52] U.S. Cl. ............. 370/392; 370/397; 370/409
[58] Field of Search ................. 370/392, 395, 370/397, 399, 409

[56] References Cited

U.S. PATENT DOCUMENTS

| | | |
|---|---|---|
| 5,220,563 | 6/1993 | Grenot et al. . |
| 5,274,680 | 12/1993 | Sorton et al. . |
| 5,323,389 | 6/1994 | Bitz et al. . |
| 5,381,410 | 1/1995 | Grenot . |
| 5,394,393 | 2/1995 | Brisson et al. . |
| 5,414,701 | 5/1995 | Shtayer et al. ............... 370/397 |
| 5,479,401 | 12/1995 | Bitz et al. ............... 370/399 |
| 5,481,687 | 1/1996 | Goubert et al. ............... 370/392 |
| 5,546,387 | 8/1996 | Larsson et al. ............... 370/409 |

OTHER PUBLICATIONS

IBM Technical Disclosure Bulletin, vol. 37, No. 4B, "Asynchronous Transfer Mode Cell Routing", Armonk, NY, US, Apr. 1994, pp. 415–417.

*Primary Examiner*—Melvin Marcelo
*Attorney, Agent, or Firm*—Oblon, Spivak, McClelland, Maier & Neustadt, P.C.

[57] ABSTRACT

The method of identifying, in a memory space of the node, a virtual circuit of a network to which the cell belongs, on the basis of virtual path numbers VPI and virtual channel numbers VCI contained in the header of the cell. This method includes addressing the memory space of the node on the basis of the virtual path number VPI contained in the header of the cell to identify a first context zone in this space indicating the range of virtual channels that can be used by the cell for this VPI, and addressing a second context zone on the basis of a virtual channel number VCI contained in the header of the cell and a basic address read in the first context zone to obtain the list of directions to be taken by the cell at the exit from the node, as well as the new header.

6 Claims, 4 Drawing Sheets

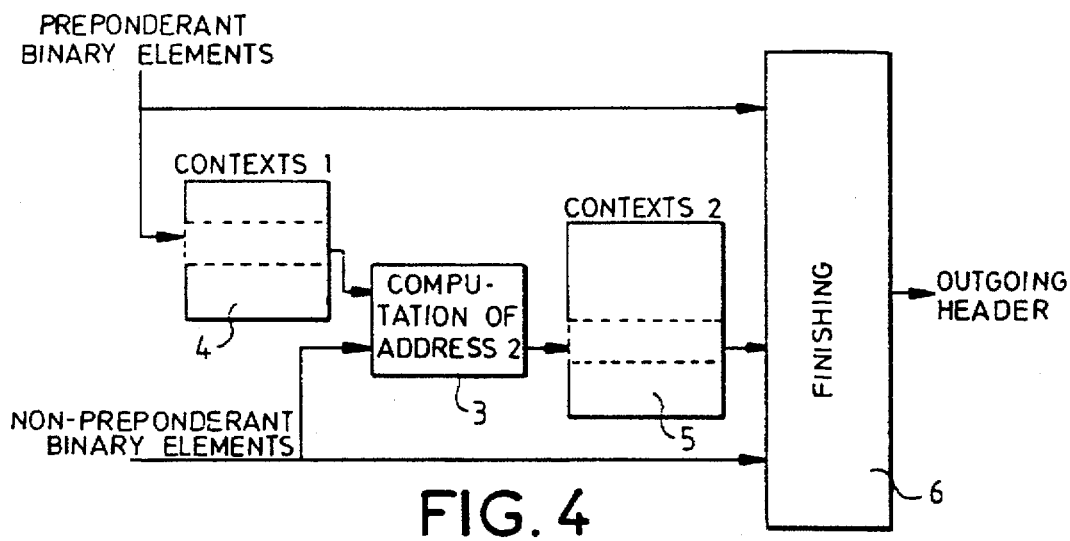
FIG. 4
| | VPI IN PERMITTED RANGE | VPI OUTSIDE PERMITTED RANGE |
|---|---|---|
| VCI IN PERMITTED RANGE | COMPLETE TRANSLATION | REJECTION BY NON-VALIDITY OF THE CONTEXT 1 |
| VCI OUTSIDE PERMITTED RANGE | REJECTION OR TRANSPARENCY TO INCOMING VCI | REJECTION BY NON-VALIDITY OF THE CONTEXT 1 |
FIG. 5
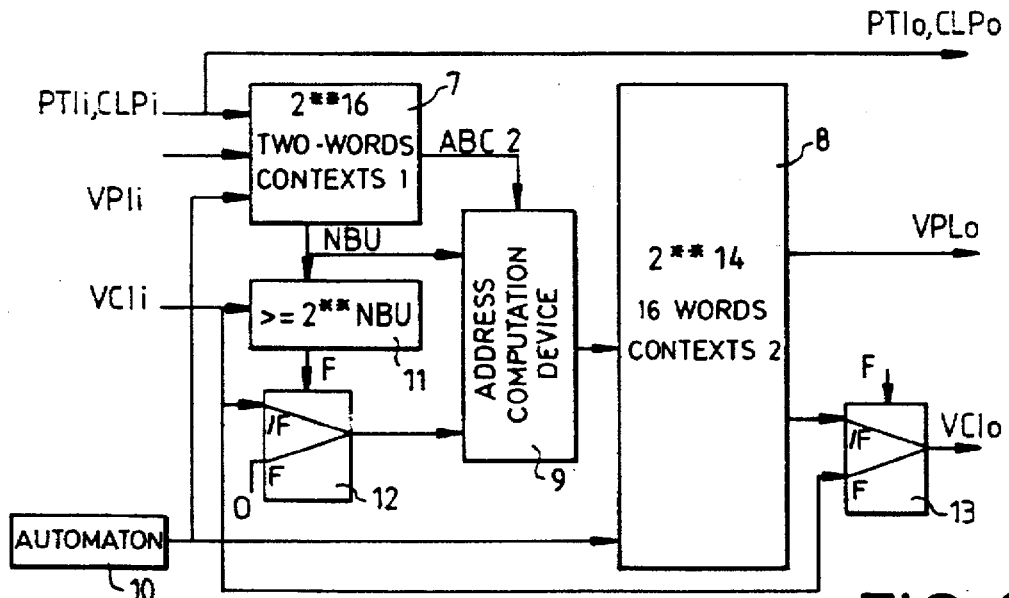
FIG. 6

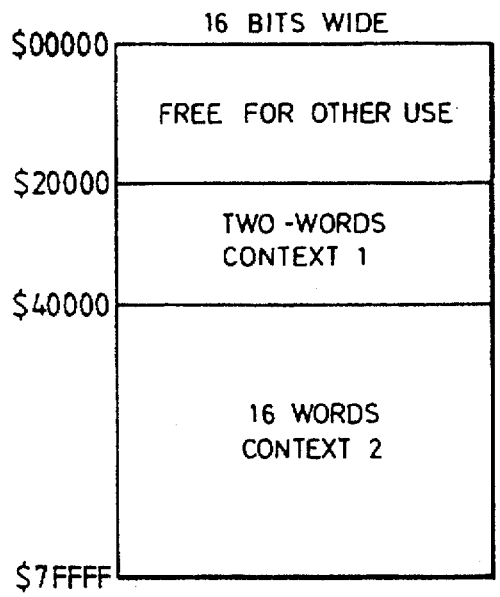

FIG. 7

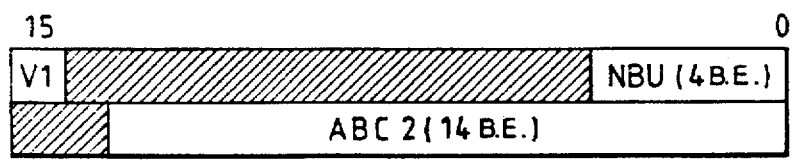

FIG. 8

| TYPE OF CELL | EXTRACTION | OBSERVATIONS |
|---|---|---|
| META-SIGNALLING | YES | ANY VPI, VCI=1, PTI=0 OR 2 |
| GEN. DIST. SIGNAL | YES | ANY VPI, VCI=2, PTI=0,1,2 OR 3 |
| POINT-TO-POINT | YES | ANY VPI, VCI=5, PTI=0,1,2 OR 3 |
| SECTION OAM F4 | YES | ANY VPI, VCI=3, PTI=0 OR 2 |
| END-TO-END OAM F4 | YES | ANY VPI, VCI=4, PTI=0 OR 2 |
| SECTION OAM F5 | YES | ANY VPI AND VCI, PTI=4 |
| END-TO-END OAM F5 | YES | ANY VPI AND VCI, PTI=5 |
| MANAGEMENT OF RESOURCES | YES | ANY VPI AND VCI, PTI=6 |
| NON-ASSIGNED CELL | YES | VPI=0, VCI=0, ANY PTI, CLP=0 |

FIG. 10

METHOD AND DEVICE FOR THE TRANSLATION OF A CELL HEADER APPLIED TO THE ENTRANCE TO A NODE OF AN ASYNCHRONOUS NETWORK FOR THE TRANSMISSION OF DATA BY PACKETS

BACKGROUND OF THE INVENTION

The present invention relates to a method and device for the translation a cell header applied to the entrance to a node of an asynchronous network for the transmission of data packets.

It can be applied notably to digital data shuffling and switching equipment forming a network working in the transmission mode known as the ATM or asynchronous transfer mode.

The asynchronous transfer mode (ATM) is defined chiefly by the recommendations of the UIT-T (series I) as well as in the publications of a group of industrialists known as the ATM Forum.

In the asynchronous transfer mode, the information elements to be transmitted are assembled in the form of packets having a length of 48 bytes preceded by a 5-byte header. The unit formed by the header plus the data elements is called a cell. In its principle mode, the ATM works in a connected mode, i.e. it requires the setting up of a route in the transmission network before it can send data elements. This route is called a "virtual circuit". In general, there are several virtual circuits that use the same physical connection between two ATM installations. The main role of the header of the cells is to enable the identification of the virtual circuits on the link. An exemplary implementation of such a method is known inter alia from the French patent application No. 2 681 164 filed on behalf of the present Applicant.

According to this method, each packet of data to be conveyed in a network is formed, firstly, by a header enabling it to be identified and guided through virtual channels and, secondly, a part containing the information elements to be conveyed. The routing is done at each node of the network through (1) the extraction, from the header, of the address of a word contained in a first context memory containing the information needed to identify the header and guide the data elements to be conveyed, and (2) through the creation, on the basis of the word read in the first context memory, of a new address. This new address is used as a pointer to a zone of a second context memory in which there is at least one new header and a piece of information on an outgoing direction for the packet or packets coming out of the node.

The translation function thus fulfilled enables the association, with each cell header, of the information elements enabling it to undergo the processing operations for which it is designed. The translator responsible for performing this function on each cell that it receives must typically give information on the validity of the virtual path, the validity of the virtual channel, the counting, the list of outgoing directions on which the received cell is sent, the new header associated with the cell during its transmission, etc. The translator should also perform the processing operations corresponding to the context defined previously for each cell. These processing operations relate notably to the switching of the virtual path (VP), the switching of the virtual channel (VC), the switching of the virtual path and virtual channel (VP/VC), and the extraction of the maintenance flows.

Other functions and processing operations may also be envisioned to enable the identification of the different types of cells: these are the functions of a free cell, meta-signalling, general distribution, point-to-point signalling, management of resources, non-allocated cells, etc. Furthermore, during the switching of a cell and depending on the nature of the switch, the translator must be capable of providing a certain degree of transparency, i.e. it should be capable of transferring certain fields of the header of the incoming cell into the header of the outgoing cell. It is thus, for example, that it should be capable of providing a degree of transparency to the virtual channel identification or VCI field during a switching of a virtual path, a degree of transparency to the cell loss priority or CLP field and a degree of transparency to the PTI (payload type indicator) field pertaining to the payload of the cell.

The processing operations described above must be relatively easy to perform. Their programming is done as a function of the cells and of the state of the network over a relatively wide range of input and output values. The processing time is short and smaller than the reception time of a cell. This time is in the range of 12.3 µs at 34.368 Mbit/s, 2.7 µs at 155.52 Mbit/s and 680 ns at 622 Mbit/s.

At the structural level, the translation function may be simply achieved by means of a memory array addressed by a microprogrammed processing unit.

The main difficulty results however from the need to implement a very large memory array formed, for example, by $2^{32}$ words of 16 bits and to organize it to enable the performance of the above-described translation function.

SUMMARY OF THE INVENTION

The aim of the invention is to overcome the above-mentioned drawbacks.

To this effect, an object of the invention is a method for the translation of a cell header applied to the entrance to a node of an asynchronous network for the transmission of data packets including the identification, in a memory space of the node, of the virtual circuit of the network to which the cell belongs, on the basis of virtual path numbers VPI and virtual channel numbers VCI contained in the header of the cell, wherein said method includes the steps of:

- addressing the memory space of the node on the basis of the virtual path number VPI contained in the header of the cell to identify a first context zone in this space indicating the range of virtual channels that can be used by the cell for this VPI,
- and addressing a second context zone on the basis of a virtual channel number VCI contained in the header of the cell and a basic address read in the first context zone to obtain the list of directions to be taken by the cell at the exit from the node as well as the new header.

An object of the invention is also a device for the implementation of the above-mentioned method.

BRIEF DESCRIPTION OF THE DRAWINGS

Other features and advantages of the invention shall appear from the following description, made with reference to the appended figures, of which:

FIG. 4 illustrates steps of the method according to the invention.

FIG. 5 is a table summarizing the virtual path and virtual channel switching actions.

FIG. 6 is an embodiment of a translation device for the implementation of the method according to the invention.

FIG. 7 shows a mode of organization of the memory space of the translator according to the invention.

FIG. 8 exemplifies the formatting of a first context zone.

FIG. 10 exemplifies a table for the extraction of possible cells.

DETAILED DESCRIPTION

Figure 1:
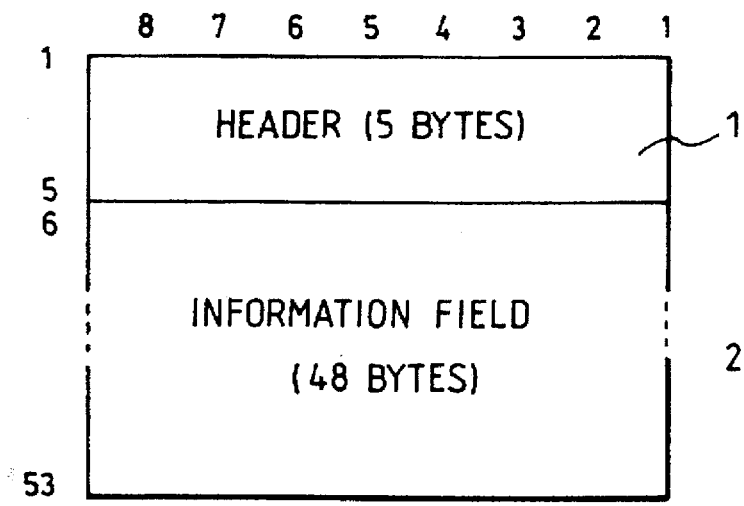
FIG. 1 exemplifies a format of an ATM cell.
Figure 2:
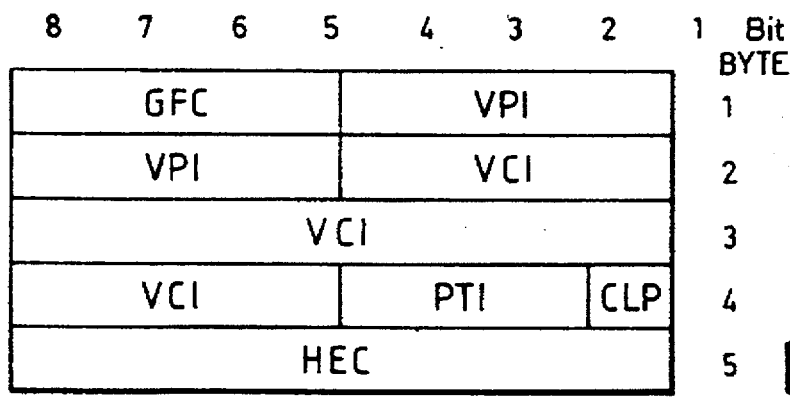
FIGS. 2 and 3 show the format of an ATM cell header in the case of a user/network interface and an interface between network nodes.
Figure 3:
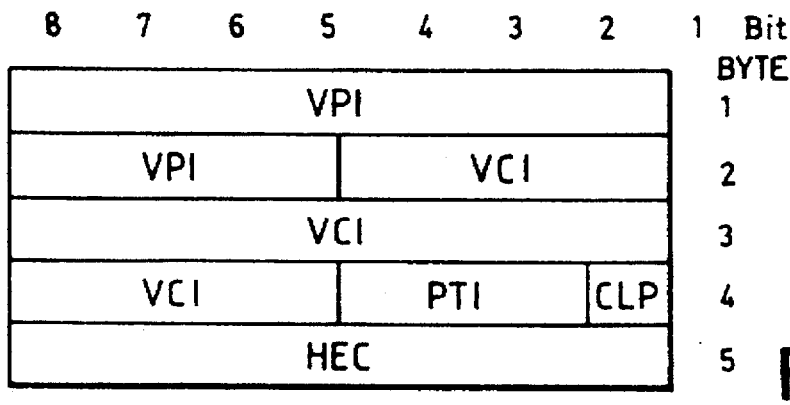

The format of an ATM cell is recalled in FIG. 1. It includes a header 1 encoded in 5 bytes and an information field 2 encoded in 48 bytes. The information field 2 contains the useful information to be conveyed. Two header formats are considered depending on whether the cells go through a user/network interface or an interface between network nodes. These headers are shown respectively in FIGS. 2 and 3. These headers have different fields called the CLP, GFC, VPI, HEC, VCI and PTI fields which have the following meanings.

The CLP field is encoded in one bit. It indicates that the cell is a cell loss priority cell or a cell loss non-priority cell in the event of congestion of the network.

The GFC field is encoded in four bits. It makes it possible, solely in the case of a cell going through a user/network interface, to control the flow between a user and the network. This field may also enable the connection of several terminals to one and the same interface point.

The VPI field is encoded in three bits. This field makes it possible to identify the virtual path to which the cell belongs. This path brings together several virtual channels (VC) to enable processing common to all these channels.

The HEC field is encoded in eight bits. This field is a control field that enables the detection and at times the correction of errors throughout the cell.

The VCI field is encoded in sixteen bits. This field identifies the virtual channel to which the cell belongs in the virtual path VP indicated.

The PTI field is encoded in three bits. It indicates the cell payload type.

The header translation function performed by an ATM machine has the role of associating, with each header of a cell, the information elements enabling it to undergo the processing operations for which it is designed and to perform these processing operations.

The information elements that the translator must typically give are, among others, information elements on the validity of the virtual path and virtual channel, on the counting of the cells, the list of outgoing directions on which a received cell will be sent, and the new header associated with the cell when it is sent.

To simplify the explanation, it is assumed hereinafter that the HEC field is used upline with respect to the translator and that only the cells having a header assumed to be accurate will arrive at the entrance to the translator.

The corresponding processing operations are performed according to the invention by analyzing the header in two steps as indicated in FIG. 4. A first step examines the most significant binary elements whose meaning is almost always used. In a second step, the the binary elements whose use depends on the mode of operation are examined.

The association between the result of the first step and the input of the second is achieved by a pointer. The value of this is that it makes it possible, for example, not to analyze the VCI field for the virtual paths VP in virtual path switching mode. This leads to a considerable savings in memory. As compared with what is indicated in the method that was the object of the above-mentioned patent application, the improvement provided by the invention consists of the fact that the type of switching (VP, VC, VP/VC) is no longer indicated explicitly in the first context memory but implicitly by an information element relating to the "number of useful bits of the VCI field."

The device shown in FIG. 4 has an address computation device 3 coupled between two context memories 4 and 5. A so-called finishing device 6 is coupled to the output of the memory 5 to shape the outgoing header.

The first context memory 4 enables the performance of the first analysis. This memory 4 is addressed by the most significant bits. It has a context validation element to prohibit contexts that are not initialized or that the control unit of the switch has decided not to use, a pointer towards the context zone 2 to continue the analysis, and the VCI range used.

The second context memory 5 is used as a medium for the second analysis. This memory is addressed by the address computation device 3 by means of the pointer coming from the first step and given by the first memory 4 and by means of a portion of the residual binary elements of the incoming header that depends on the number of useful binary elements given by the first step.

The memory 5 typically contains a context validation element to prohibit the second type contexts that are not initialized or that the control unit of the switch has decided not to use, the list of outgoing directions in which the incoming cell will be re-transmitted, the header or headers of the outgoing cell and traffic counters, error counters, etc.

The computation device 3 is aimed at making use of the result of the first step to deduce an address therefrom in the second context memory 5 to be associated with the incoming cell. This address is computed as follows: the address pointer read in the first context memory 4 indicating the shifting of the zone of the second type of contexts associated with the first type of context is added to the VCI field of the incoming header multiplied by the size of the context 2 counted in terms of number of memory words needed to stack a second type of context.

Thus, the Jth VC uses the Jth second type context associated with the context.

Under these conditions, if the VCI of the incoming header is in the range indicated in the first context memory 4, then the VCI of the incoming header is used to compute the address in the second context memory 5. Otherwise, the computation of the address in the memory 5 is done by taking the value VCI=0.

The finishing device 6 shapes the outgoing header as a function of the validity of the context of the second type. To do this, the following rule is adopted, in considering whether the incoming VCI field is not in the range indicated in the first type of context while the outgoing VCI field is placed so as to be equal to the incoming VCI field. If this is not the case, the outgoing VCI is taken in the second context memory 5.

The statement of the above principles makes it possible to envision modes of switching virtual paths, virtual channels and virtual paths and channels. For a virtual path switching, it is enough to indicate the fact that the number of useful binary elements of the VCI field is zero. There are two possibilities then, depending on whether or not the value of the VCI field is different from zero.

If the value of the VCI field is not zero, the contents of the memory 5 of the second context corresponding to the zero virtual channel VCI of the virtual path VP considered for all the non-zero VCI fields are used, by applying a degree of transparency for the incoming VCI field.

If the VCI field is zero, the second context of the memory 5 corresponding to the zero virtual channel VC is used normally. In this case, the VCI field after translation may be different from zero.

In this virtual path (VP) switching mode, pre-assigned values may be given to the low values of the VCI field so as to signify that, for a given virtual path VPI, the useful binary elements are such that all the pre-assigned values occur therein. Since only a few bits of the VCI field are used, this means taking up only very little memory space. This makes it possible to obtain a complete translation for these cells with a specific processing operation leading, for example, to a rerouting towards a data bank.

To carry out a virtual channel switching, it is enough to position the same pointer and hence the same second contexts in all the contexts of the first type that correspond to the VPI range permitted (not analyzed in this case). The number of useful binary elements of the VCI field is then programmed as a function of the VCI range to be processed. The cells that comprise off-range virtual paths VPI are rejected at the first context memory 4. The cells comprising off-range virtual channels are rejected at the second context memory 5.

To achieve a virtual path and channel switching, the VPI and VCI fields are both used in order to identify the virtual channels and associate an outgoing header with them. For each virtual path VPI of the range permitted, there is defined an associated virtual path VCI range as well as a pointer towards a zone of the second context memory 5. The second context memory 5, for this purpose, is split up into as many context zones of the second type as there are different pointers. The coherence of this division is entrusted to a translation management device (not shown). A summary of the action taken, resulting from the fact that a virtual path VPI or a virtual channel VCI is within or not within the permitted ranges, is recorded in the table of FIG. 5.

It is thus possible to mix the types of paths (VD, VP/VC) and to extract low value logic channels therefrom, while at the same time optimizing the use of the memory or again, for each VP, to mix the VP and VC mode (with or without differentiation of the processing according to the VCI) according to the value of the VCI field.

In a manner similar to that of FIG. 4, the device for the implementation of the method according to the invention shown in FIG. 6 comprises a first context memory 7 coupled to a second context memory 8 by means of an address computation device 9. Although separate in FIG. 6, the two spaces formed by the memories 7 and 8 may possibly be contained in one and the same physical memory in the manner shown in FIG. 7. A programmed automaton 10 enables the generation of least significant addresses that enable the performance of operations within the memories 7 and 8. It enables the selection of the memories 7 and 8 as a function of the progress of the translation process. The device also has a comparator 11 coupled between the data outputs of the memory 7 and a multiplexer circuit 12, as well as a multiplexer circuit coupled to a data output of the memory 8. The comparator 11 positions the signal F in the true state if the value $2^{VCI}$ is greater than or equal to the value $2^{NBU}$, namely when the value VCI is not in the permitted range. The address computation device 9 converts the binary elements of the pointer read in the context memory 7 at an address in the memory 8. This conversion, performed by the addition of a basic address ABC2 of a context 2 to the NBU field, may thus be performed by a simple masking of the non-useful binary elements of the VCI field by the corresponding binary elements of the basic address ABC2 in assuming that the field ABC2 indicates an address of the $K \times 2^{NBU}$ type. If it were otherwise, the division of the memory between the different context 2 zones would not be done.

If the incoming VCI is in the range indicated in the context 1, the multiplier 12 sends this value to the address computation device 9 under the effect of the signal F for the computation of the address in the memory 8 according to the relationship (1). If not, the multiplexer 12 sends the value VCI=0. Also, the incoming VCI is transmitted to the output of the multiplexer 13 if the incoming VCI is outside the range indicated in the context 1 or the VCI obtained at output of the memory 8 if the incoming VCI is in the range indicated by the context memory 8.

Figure 9:
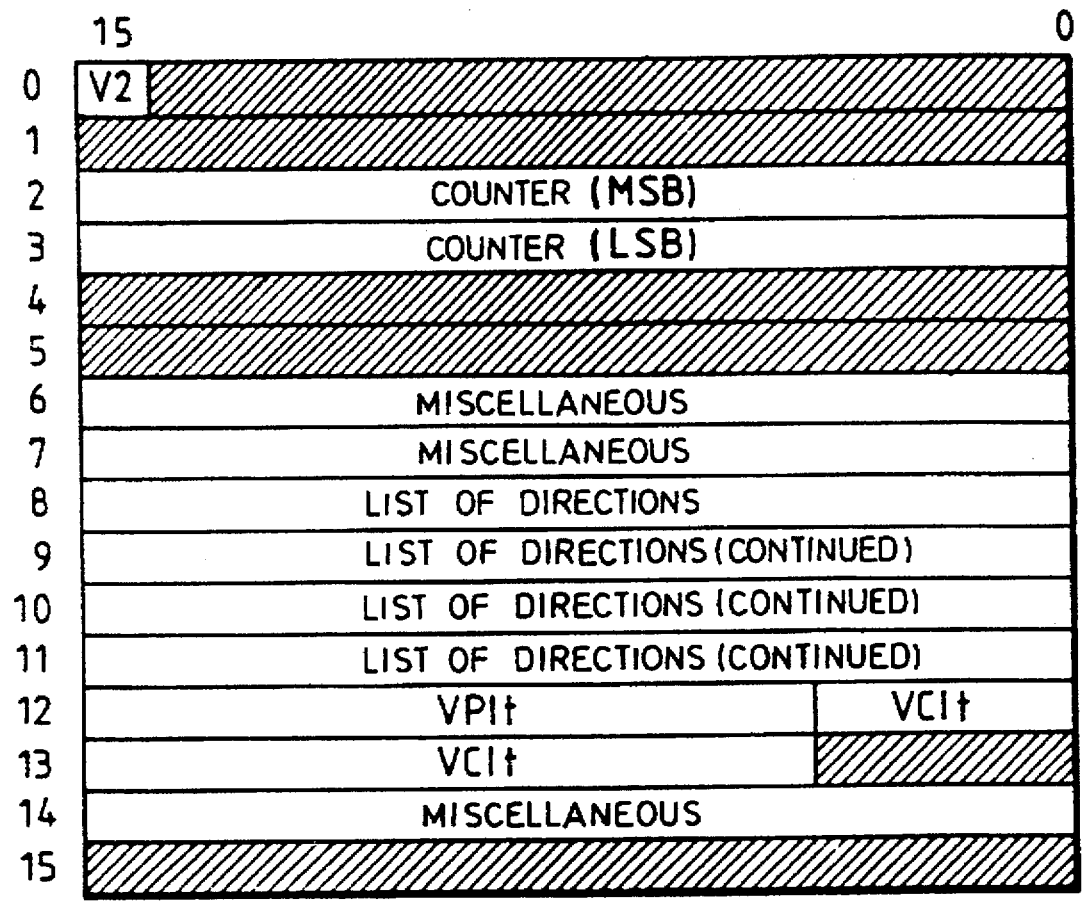
FIG. 9 exemplifies the formatting of a second context zone.

An example of the payload of the contexts 1 and 2 associated with each cell is shown in FIGS. 8 and 9. In FIG. 8, the context 1 is determined and addressed in the memory 7 by the VP1, PTI and CLP fields of the incoming cell. The context 1 occupies a space formed by two 16-bit memory words. These words are formed by a field V1 that specifies the validity of the context 1, an NBU field that gives the number of useful bits of the associated VCI field (the corresponding range having a value of 0 to $2^{NBU}-1$) and a field ABC2 that gives the basic address of the context 2 corresponding in the memory 8 to the starting address of the zone reserved in the memory 8 for the context 2 and that is assigned to the context 1. In FIG. 9, the context 2 takes up a space of 16 words of 16 bits in the memory 8. The addressing of the memory zones of a context 2 associated with a context 1 is determined by the basic address ABC2 of the context 1 and by the words with the VCI address words or the 0 address words given by the output of the multiplexer 12 as a function of the number of useful bits NBU. The words of the context 2 consist of a field V2 that specifies the validity of the context 2, a COUNTER field that represents a counter for the use of the context 2, several 16-bit fields forming a LIST of DIRECTIONS that give the directions to be taken by the cell, VPIT and VCIT fields that represent the values of the VPI and VCI fields of the outgoing cell. Fields known as MISCELLANEOUS fields may be used for other purposes.

The architecture of the translator that has just been described can be used to obtain a mode of switching of virtual paths throughout the range encoded on 12 bits of the VPI and a mode of switching of virtual channels up to a value of $2^{14}$ channels with the constraint of having $2^i$ virtual channels per VPI. In particular, it entirely meets the requirements of the UIT.1.361 recommendation relating to capacities of extraction of the different values referred to in this recommendation, among others for VPs used in VP mode (without translation of the VCs). The main possibilities of extraction are summarized in the table of FIG. 10.

What is claimed is:

1. A method for translating a cell header applied to an entrance to a node of an asynchronous network for transmitting data packets by identifying, in a memory space of the node, a virtual circuit of the network to which a cell belongs, based on a virtual path number (VPI) and a virtual channel number (VCI) contained in the cell header of the cell, the method comprising the steps of:

addressing the memory space of the node based on the VPI contained in the cell header of the cell to identify a first context zone in the memory space indicating range of usable virtual channels for the cell for the VPI, addressing a second context zone based on the VCI contained in the cell header of the cell and a basic address read in the first context zone to obtain (1) a list of directions to be taken by the cell at an exit from the node and (2) a new header, wherein the step of addressing the second context zone comprises:

computing an address of the second context zone by adding (1) the basic address contained in the first context zone and (2) the VCI contained in the cell header of the cell, and giving the VCI a zero value when the VCI contained in the cell header is outside the range of usable virtual channels.

2. A method according to claim 1, further comprising recording, as the VCI in the new header going out of the node, the VCI of the cell at the entrance to the node when the VCI of the cell goes beyond the range of the usable virtual channels defined by a number of useful bits.

3. A device for the translation of a cell header applied to the entry of a node of an asynchronous network for transmitting data packets, the device comprising:

first and second memories comprising first and second context zones, respectively; and an address computation device coupled between the first context memory and the second context memory to identify a virtual circuit of the network to which the cell belongs based on a virtual path number (VPI) and a virtual channel number (VCI) contained in the header of the cell, wherein the first context zones are addressed by the virtual path number contained in the cell header of the cell, and wherein the second context zones indicate a list of directions to be taken by the cell at an exit from the node, and wherein the address computation device addresses the second context zones based on (1) a basic address read in the first context zone and (2) the VCI contained in the header of the cell entering the node, the address computation device comprising:

a comparator circuit to compare the VCI of the cell entering with a number of available channels indicated in the first context zone; and a first multiplexer controlled by the comparator circuit to set the VCI to zero when computing the address of the second context zone.

4. The device according to claim 3, further comprising a second multiplexer having first and second inputs, wherein the first input couples to an output of the second memory, and wherein the second input receives the VCI to transmit the VCI of the cell exiting the node.

5. The device according to claim 4, wherein the first context zone comprises a first data field to specify a validity of the first context zone, a second field to specify the number of useful bits of a VCI field of an associated virtual channel and a third field containing the basic address of the second context zone.

6. The device according to claim 5, wherein the second context zone comprises a first data field, a second COUNTER field, third "LIST OF DIRECTIONS" fields, a fourth VPI field and a fifth VCI field, wherein the first data field specifies a validity of the second context zone, the second COUNTER fields count uses of corresponding second context zones, and the third "LIST OF THE DIRECTIONS" fields give directions that the cell must take.

* * * * *